A. C. COLBURN.
REINFORCEMENT FOR FLEXIBLE SHEET MATERIALS.
APPLICATION FILED JULY 7, 1915.
1,185,067.            Patented May 30, 1916.
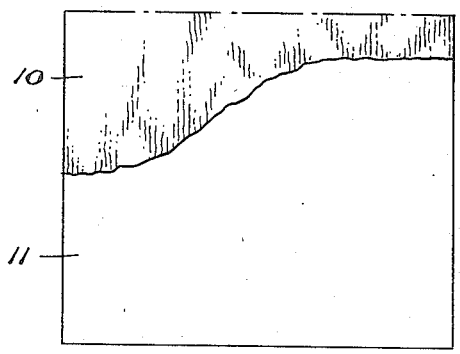
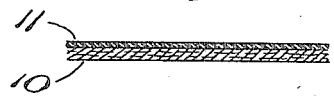
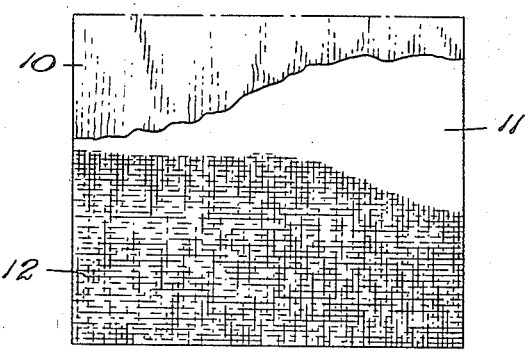
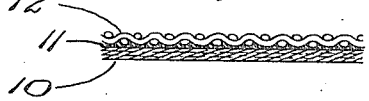

UNITED STATES PATENT OFFICE.

ALVIN C. COLBURN, OF PORTSMOUTH, OHIO, ASSIGNOR TO THE SELBY SHOE COMPANY, OF PORTSMOUTH, OHIO, A CORPORATION OF OHIO.

REINFORCEMENT FOR FLEXIBLE SHEET MATERIALS.

1,185,067.

Specification of Letters Patent. Patented May 30, 1916.

Application filed July 7, 1915. Serial No. 38,610.

*To all whom it may concern:*

Be it known that I, ALVIN C. COLBURN, a citizen of the United States, and resident of Portsmouth, in the county of Scioto and State of Ohio, have invented certain new and useful Improvements in Reinforcements for Flexible Sheet Materials, of which the following is a specification.

The object of the present invention is to provide an improved reinforcement for flexible sheet materials such as leather, cloth, paper, and felt.

On the accompanying drawings: Figure 1 represents an elevation of a piece of reinforcing material prepared in accordance with the present invention. Fig. 2 represents a sectional view, on a larger scale, of a piece of such reinforcing material. Fig. 3 represents an elevation of a piece of flexible sheet material with the reinforcing material as shown by Fig. 1 applied thereto. Fig. 4 represents a sectional view of the several elements united as in Fig. 3.

The same reference characters indicate the same parts wherever they occur.

Although I have mentioned leather, cloth, paper and felt as sheet materials to which my improved reinforcing material is applicable, it is not to be understood that the naming of such sheet materials is to be regarded as in any way limiting the scope of the invention to leather, cloth, paper and felt. Any flexible sheet material may be reinforced by the reinforcement which I will now describe.

I provide as the reinforcing element a tough flexible sheet material 10 such as paper, fiber-board, cloth, or jute-board, which is initially absorbent but which is impregnated with a substance or compound by which it is rendered impervious to moisture, grease or hydrocarbons. It is not necessary, for the purposes of the present invention, to specify the substance or the ingredients of the compound by which the reinforcing element is rendered impervious to moisture, grease or hydrocarbons. For this matter it will be sufficient to state that there is now on the market a commodity known and sold under the trade name "Duraflex" which is suitable for my purpose, said commodity being made of tough flexible paper and impregnated with a substance or compound by which it is rendered impervious to moisture, grease and hydrocarbons.

I apply to the reinforcing element impregnated as hereinbefore stated a coating 11 of adhesive moisture-proof substance which is relatively hard though pliant at ordinary temperatures and which is capable of being rendered soft and tacky by a moderate degree of heat. Such substance may be gutta-percha or any other substance having the characteristics above specified. By "a moderate degree of heat" I mean a degree of heat which will not burn, scorch, or otherwise injure the sheet materials with which the adhesive material 11 is associated.

The impregnated sheet 10 of reinforcing material having the coating of adhesive material 11 adhering thereto may be placed on the market for sale as a reinforcing element *per se* and may be used for reinforcing any flexible sheet material for which such reinforcement may be necessary or desirable. The reinforcing element may be applied to a sheet of flexible material 12 by laying the latter against the coating of adhesive material 11 and by applying a hot iron or by otherwise heating the adhesive substance, at the same time applying a moderate degree of pressure, to cause the adhesive material to acquire a tacky condition and to adhere to the element 12 which is to be reinforced. When the adhesive material 11 cools to atmospheric temperature, the members 10 and 12 of flexible sheet material are firmly united thereby, and the assemblage is ready to be put to use.

As an example of one of the uses for which my improved reinforcement is desirable, I may cite the present prevailing style of shoes which have cloth tops or cloth inserts. When cloth is closed for the tops or inserts of shoes, it is necessary to provide some non-elastic lining or other element which will sustain the stresses to which the shoe is subjected, to thus relieve the cloth top or inserts from such stresses. The reinforcement, if made of paper, is especially suitable for cloth tops or cloth inserts of shoes, for its relieves the cloth tops or inserts from stresses and thus guards the shoe against stretching. For shoes it is important that the reinforcing element 10 be impervious to hydrocarbons, because gasolene or similar hydrocarbon is an ingredient of the cement which is used to hold the inwardly folded edges of the cloth; and if a hydrocarbon such as gasolene were permitted to percolate through the element 10 it would dissolve the gutta-percha or other substance 11, which is extremely thin, and would reach the outer cloth and cause a discoloration of the latter.

I claim:

1. The combination with a tough, flexible sheet material impregnated with a substance or compound by which it is rendered impervious to moisture, grease, and hydrocarbons, of a coating of moisture-proof adhesive substance, which, at ordinary atmospheric temperatures, remains relatively hard though pliant, but which is rendered soft and tacky by a moderate degree of heat.

2. The combination with an article of flexible sheet material, of a reinforcing element of flexible sheet material applied thereto, said reinforcing element being impregnated with a substance or compound by which it is rendered impervious to moisture, grease, and hydrocarbons, and an intermediate layer of moisture-proof adhesive substance uniting said article and reinforcing element by adhesion, said adhesive substance being tough and pliant at ordinary atmospheric temperatures.

In testimony whereof I have affixed my signature.

ALVIN C. COLBURN.